(12) United States Patent
Chivers et al.

(10) Patent No.: US 9,281,088 B2
(45) Date of Patent: Mar. 8, 2016

(54) INSTRUMENT FOR NUCLEAR POWER FACILITY

(75) Inventors: Jeffery D. Chivers, Lakeville, MN (US); Daniel A. Norberg, New Brighton, MN (US)

(73) Assignee: Rosemount Inc., Eden Prairie, MN (US)

( * ) Notice: Subject to any disclaimer, the term of this patent is extended or adjusted under 35 U.S.C. 154(b) by 433 days.

(21) Appl. No.: 12/802,420

(22) Filed: Jun. 7, 2010

(65) Prior Publication Data

US 2011/0299647 A1 Dec. 8, 2011

(51) Int. Cl.
| | |
|---|---|
| *G01L 7/00* | (2006.01) |
| *G21C 17/02* | (2006.01) |
| *G21C 17/10* | (2006.01) |
| *G01L 19/00* | (2006.01) |
| *G01L 19/06* | (2006.01) |

(52) U.S. Cl.
CPC ............ *G21C 17/02* (2013.01); *G01L 19/0084* (2013.01); *G01L 19/06* (2013.01); *G01L 19/0645* (2013.01); *G01L 19/0681* (2013.01); *G21C 17/10* (2013.01)

(58) Field of Classification Search
USPC .......................................... 376/245, 247, 254
See application file for complete search history.

(56) References Cited

U.S. PATENT DOCUMENTS

| | | | | |
|---|---|---|---|---|
| 3,940,311 A | * | 2/1976 | Frisch et al. .................. | 376/224 |
| 4,088,381 A | * | 5/1978 | Harnett .......................... | 439/190 |
| 4,958,938 A | | 9/1990 | Schwartz et al. | |
| 5,187,474 A | * | 2/1993 | Kielb et al. ............... | 340/870.18 |
| 5,524,492 A | | 6/1996 | Frick et al. ....................... | 73/706 |
| 5,710,552 A | | 1/1998 | McCoy et al. | |
| 6,508,131 B2 | | 1/2003 | Frick | |
| 6,511,337 B1 | | 1/2003 | Fandrey et al. | |
| 6,546,805 B2 | | 4/2003 | Fandrey et al. | |
| 6,609,427 B1 | | 8/2003 | Westfield et al. | |
| 7,458,275 B2 | | 12/2008 | Kleven et al. | |
| 2005/0072242 A1 | | 4/2005 | Fandrey .......................... | 73/706 |
| 2008/0245158 A1 | | 10/2008 | Hedtke ....................... | 73/861.63 |
| 2010/0104060 A1 | * | 4/2010 | Koste et al. ................... | 376/247 |

FOREIGN PATENT DOCUMENTS

| | | |
|---|---|---|
| CN | 87106642 A | 6/1988 |
| CN | 1131462 A | 9/1996 |
| CN | 1864055 A | 11/2006 |

(Continued)

OTHER PUBLICATIONS

Rosemount 3051 Revision 5 Pressure Transmitter (enclosed).*

(Continued)

*Primary Examiner* — Jack W Keith
*Assistant Examiner* — Sean P Burke
(74) *Attorney, Agent, or Firm* — Westman, Champlin & Koehler, P.A.

(57) ABSTRACT

In a nuclear installation, an instrument includes a sensor module connected to a process flange. The sensor module includes a support conduit with support conduit threads. An electronic circuit is wired to a connector that includes a key that is aligned with field circuit contacts of the connector. A thermal and nuclear radiation shield encloses the electronic circuit and includes a shock protection annulus. The connector is secured inside the shock protection annulus. The thermal and nuclear radiation shield includes shield threads that rotatably engage the support conduit threads to rotate an alignment of the key relative to the process flange.

10 Claims, 14 Drawing Sheets

(56) References Cited

FOREIGN PATENT DOCUMENTS

| CN | 101675322 A | 3/2010 |
|---|---|---|
| CN | 202120625 U | 1/2012 |
| DE | 10 2006 047 474 | 4/2008 |

OTHER PUBLICATIONS

Notification of Transmittal of the International Search Report and Written Opinion of the International Searching Authority, or the Declaration for PCT/US2011/038500 filed May 31, 2011; date of mailing Sep. 13, 2011, 12 pages.
Rosemonunt Nuclear: "Quick Disconnect (QDC) Nuclear Electrical Connector", 00813-0100-4812, Apr. 2002, Rev. AA.
Rosemount Nuclear: "Rosemount 1152 Alphaline Nuclear Prssure Transmitter", Reference Manual 00809-0100-4235, Rev BA, Apr. 2007.
Rosemount Nuclear: "Rosemount 1153 Series B Alphaline Nuclear Pressure Transmitter", Reference Manual 00809-0100-4302, Rev BA, Jan. 2008.
Rosemount Nuclear: "Rosemount 1153 Series D Alphaline Nuclear Pressure Transmitter", Reference Manual 00809-0100-4388, Rev BA, Jan. 2008.
Rosemount Nuclear: "Rosemount 1154 Series H Alphaline Nuclear Pressure Transmitter", Reference Manual 00809-0100-4631, Rev BA, Apr. 2007.
Rosemount Nuclear: "Rosemount 1154 Alphaline Nuclear Pressure Transmitter", Reference Manual 00809-0100-4515, Rev BA, Jan. 2008.
Rosemount Nuclear: "Rosemount 3051N Smart Pressure Transmitter for Nuclear Service", Reference Manual 00809-0100-4808, Rev CA, Jun. 2008.
Rosemount Nuclear: "Rosemount Nuclear Product Offering", http:;;www.emersonprocess.com/rosemount/nuclear/products.html. Web Aug. 24, 2010.
Notification of Reasons for Rejection (Office Action) dated Oct. 17, 2013 for Japanese Appln. No. 2013-514212.5. 5 pgs. including English Translation.
Chinese Office Action from Chinese Application No. 201110148800.4, dated Jan. 27, 2014.
Chinese Office Action from Chinese Application No. 201110148800.4, dated Sep. 22, 2014.
Communication pursuant to Article 94(3) EPC for European Patent Application No. 11 730 128.3-1556, dated Apr. 22, 2015, 6 pages.

\* cited by examiner

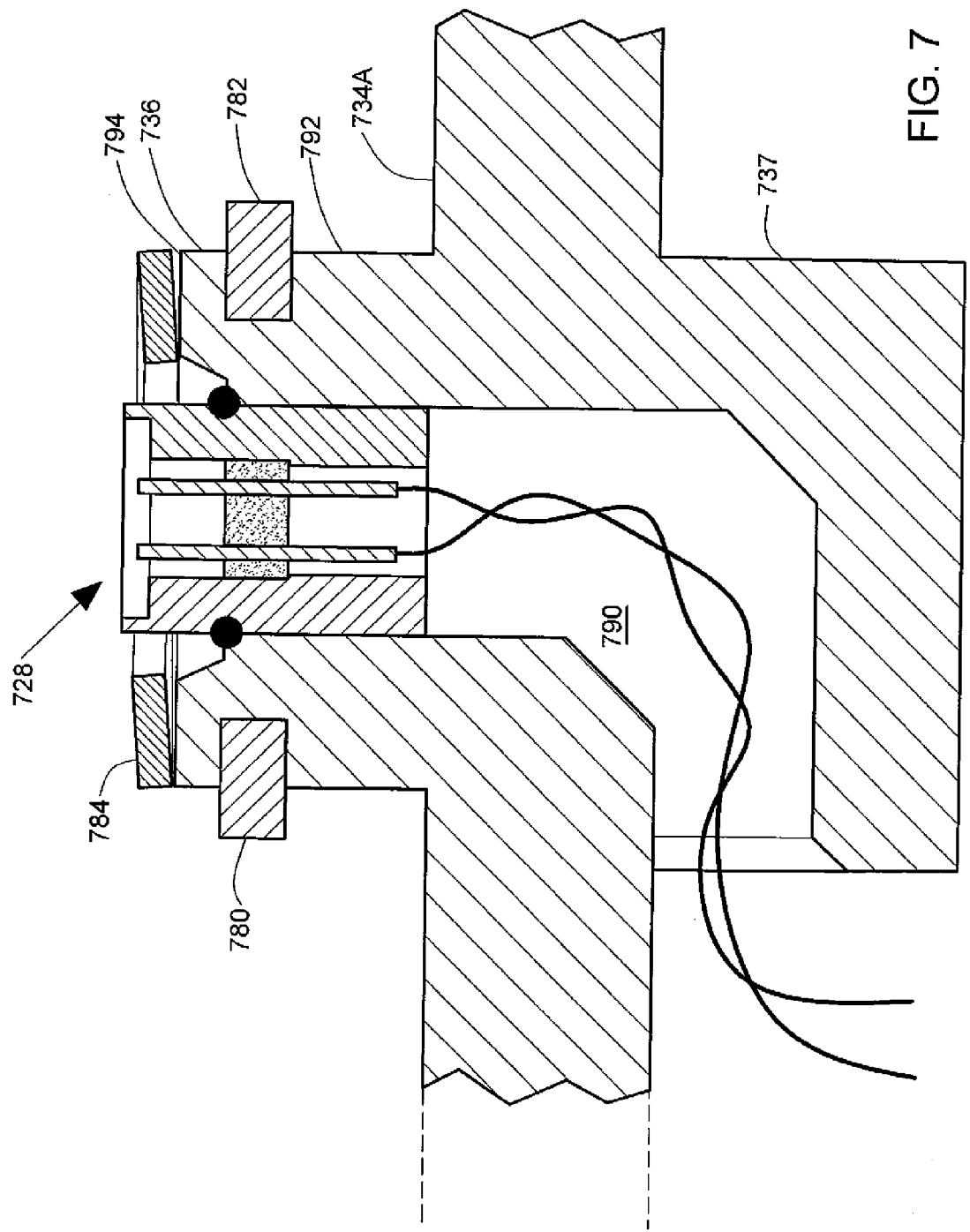

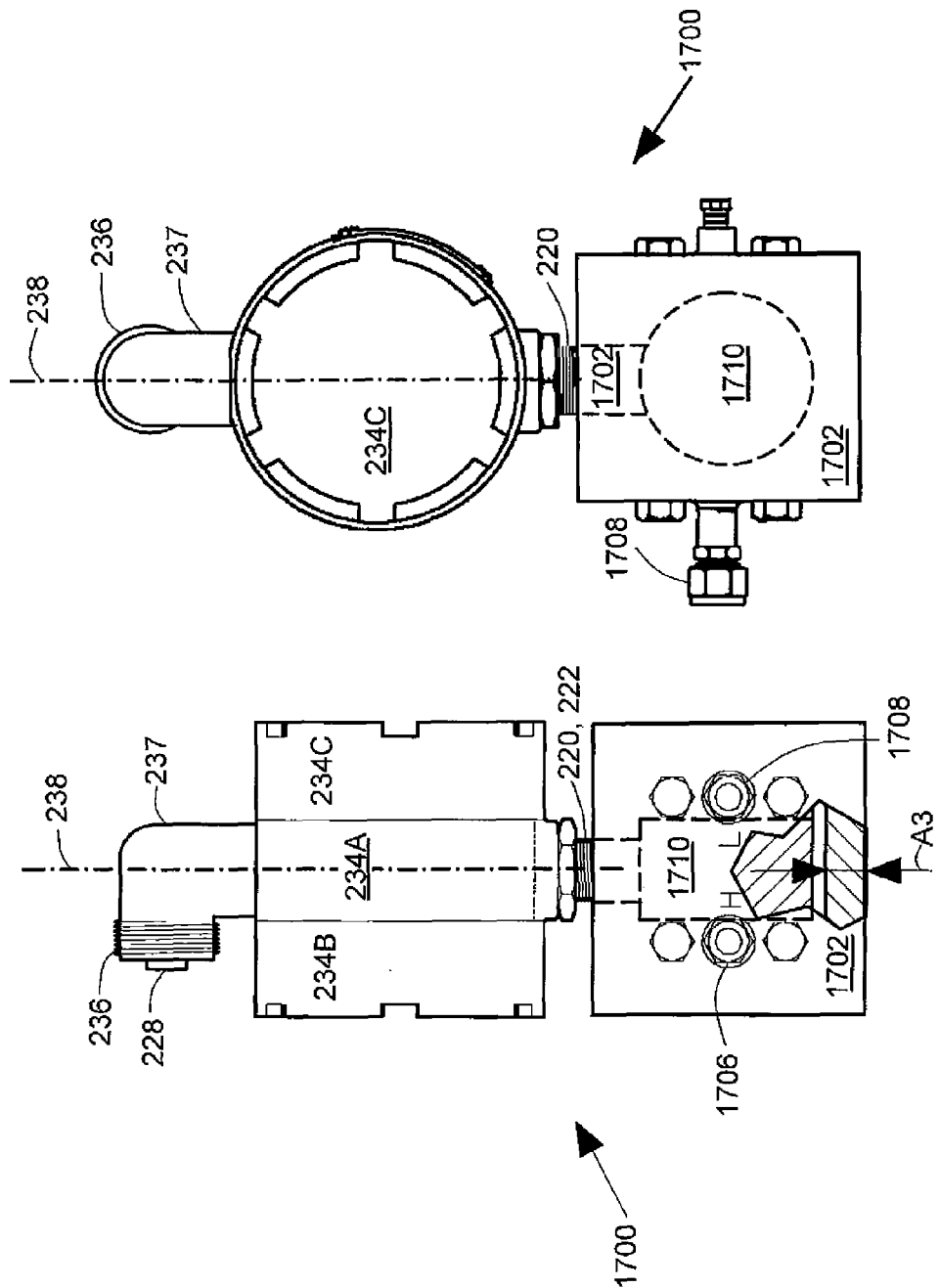

INSTRUMENT FOR NUCLEAR POWER FACILITY

BACKGROUND OF THE INVENTION

This invention relates to an instrument adapted for installation in a nuclear facility, and more particularly to a pressure sensing instrument adapted for installation in a nuclear power plant.

Instruments adapted for installation in nuclear power plants are known. Requirements for installation are becoming more stringent. In particular, there is a need to provide installation of nuclear instruments that continue to function under high vibration conditions such as a plane crashing into a nuclear power plant. Nuclear radiation can degrade the performance of electronic devices over long periods of time. Instruments in nuclear power plants are replaced from time to time, and there is a need to avoid an incorrectly polarized connection of a replacement instrument, which may not be from the same manufacturer as an instrument that is removed.

Embodiments of the present invention provide solutions to these and other problems, and offer other advantages over the prior art.

SUMMARY OF THE INVENTION

Disclosed is an instrument for connection to a process flange and to a field circuit in a nuclear installation. The instrument includes a sensor module. The sensor module is connectable to the process flange. The sensor module includes a support conduit. The support conduit has support conduit threads. The support conduit carries a sensor output lead.

The instrument includes an electronic circuit. The electronic circuit receives a sensor output from the sensor output lead.

The instrument includes a connector. The connector is wired to the electronic circuit. The connector includes a key that is aligned with field circuit contacts of the connector.

The instrument includes a thermal and nuclear radiation shield. The thermal and nuclear radiation shield encloses the electronic circuit. The thermal and nuclear radiation shield is shaped to include a shock protection annulus. The shock protection annulus protrudes from a main body of the thermal and nuclear radiation shield. The connector is secured inside the shock protection annulus. The main body is shaped to include shield threads. The shield threads rotatably engage the support conduit threads to rotate an alignment of the key relative to the process flange.

Other features and benefits that characterize embodiments of the present invention will be apparent upon reading the following detailed description and review of the associated drawings.

BRIEF DESCRIPTION OF THE DRAWINGS

FIG. 7 illustrates an enlarged cross-sectional view of an embodiment of a shock protection annulus that includes protruding pins for engaging a standard "quick connect" mating connector that is part of field wiring.

FIGS. 17-18 illustrate an embodiment of an instrument with a bilocular first thermal and nuclear radiation shield, a shock protection annulus with an elbow, a process inlet adapted to mount to a pressure lines, and a sensor module that is enclosed in a second thermal and nuclear radiation shield.

DETAILED DESCRIPTION

Figure 1:
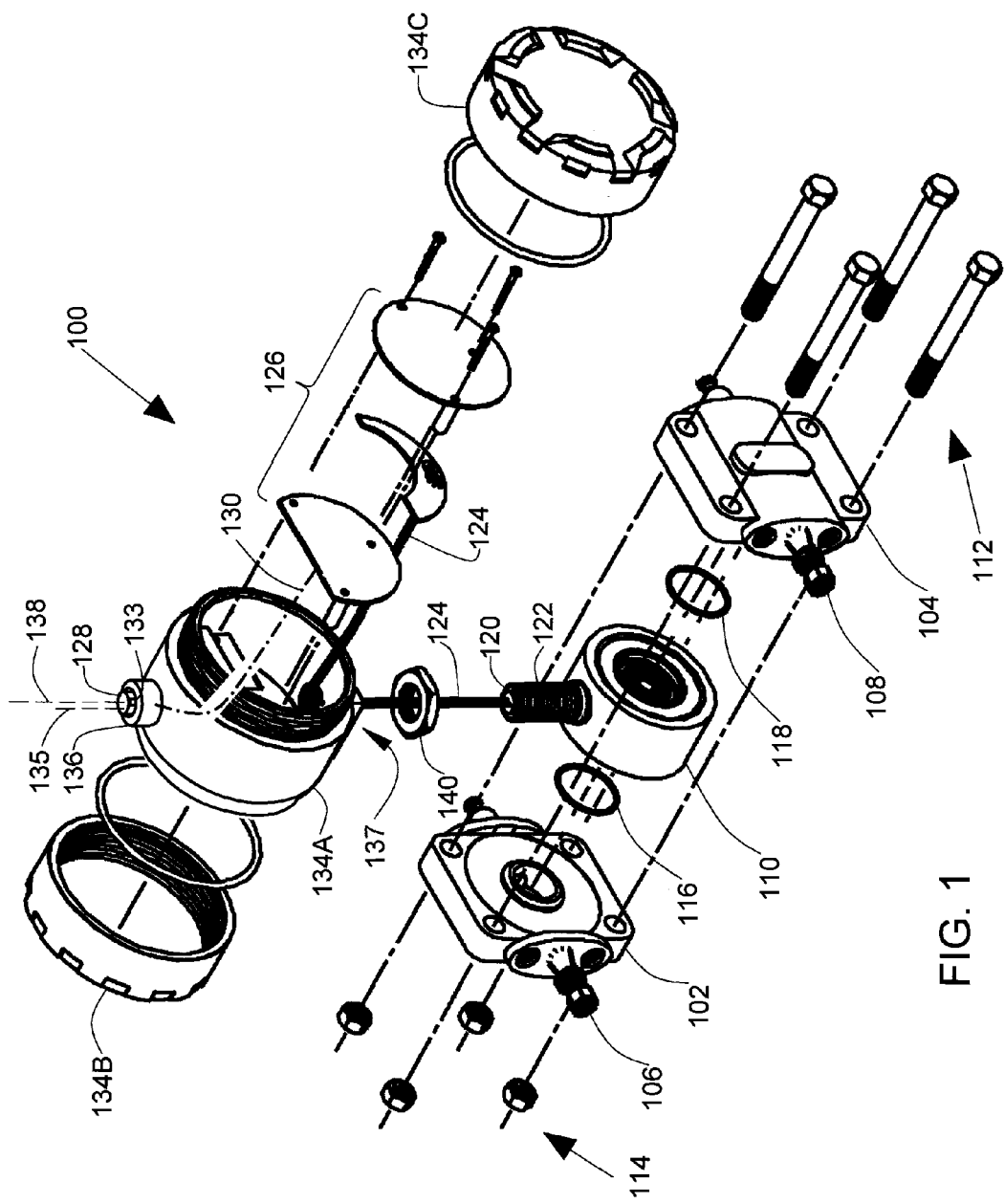
FIG. 1 illustrates an exploded view of an instrument with a bilocular thermal and nuclear radiation shield that includes a straight shock protection annulus.

In the embodiments described below, an instrument is connected in a nuclear installation. The instrument is electrically connected to a field circuit for power and signal transmission to a control room. The instrument is mechanically connected to a process flange that provides process fluid to the instrument. The instrument senses at least one property of the process fluid, such as pressure.

The instrument is provided with a thermal and nuclear radiation shield that encloses electronic circuitry. The thermal and nuclear radiation shield is shaped to include a shock protection annulus that protrudes from a main body of the thermal and nuclear radiation shield. An electrical connector includes a key and is secured inside the shock protection annulus. The main body of the thermal and nuclear radiation shield is shaped to include shield threads that rotationally engage support conduit threads of a sensor module. The rotation of the engagement of the threads rotates an alignment of the key relative to the process flange.

An instrument installed in a nuclear power plant is subject to removal and replacement when a failure occurs. Removal includes disconnection from the process and also disconnection from nuclear power plant wiring that goes to a source of power and a control system. Installation of a replacement instrument includes connection to the process and reconnection of nuclear power plant wiring to the process instrument electrical connections.

Connections to the process are rigid connections to process flanges or process pipe fittings that are part of the nuclear power plant. The rigid connection of the nuclear process instrument to the process establishes a mounting location and orientation of the nuclear instrument and, in particular, establishes a mounting location and orientation of the electrical connections on the instrument.

There are various kinds of nuclear process instruments for measuring pressure, temperature, flow, density, pH, conductivity, chemical composition and the like. One type of nuclear process instrument is a nuclear pressure instrument.

The nuclear pressure instrument includes a rotatable threaded joint that joins a sensor housing that is rigidly mounted at the process connection and a rotatable thermal and nuclear radiation shield that supports a connector for the electrical connections. During installation, the thermal and nuclear radiation shield can be manually rotated through a limited rotation range up to 360 degrees at the rotatable joint such that the keyed electrical connector on the electronics housing is adjusted to face in a convenient direction for connection to nuclear power plant wiring. The rotation capability of the nuclear pressure instrument electrical connections and the limited range of movement of the nuclear power plant wiring combine to permit convenient joining of the nuclear power plant wiring to the electrical connections.

The connections in the nuclear pressure instrument include multiple conductors. The nuclear pressure instrument has electrically polarized connections and the nuclear power plant wiring is polarized. Correctly polarized connection need to be made between the nuclear power plant wiring and the connections in the nuclear process instrument in order to ensure proper electrical operation. If polarized connections are accidentally reversed at the time of installation, the nuclear pressure instrument will not function properly, or may be damaged.

In the nuclear power plant environment, the joining of the nuclear power plant wiring to connections in the nuclear pressure instrument is required to be especially secure and resistant to pulling apart under severe conditions. According to one nuclear power industry standard, the connection is required to withstand a 9.5 g vibration representative of an airplane crashing into the nuclear power plant.

In the nuclear power plant environment, the joining of the nuclear power plant wiring to connections in the nuclear pressure instrument must be sealed so that moisture and other contaminants do not corrode the joined connections. The joining of connections is required to survive flooding under fault conditions and hosing down during clean up operations.

In the nuclear power plant environment, the joining of the nuclear power plant wiring to connections in the pressure instrument can be subject to high levels of background vibration, and the wiring and joining of connections are protected from damage due to fretting corrosion and fatigue.

An assembly of various elbows and other pipe fitting can be made at the time of installation in order to mechanically assemble an external first polarized connector on the nuclear pressure instrument. With such an arrangement, the nuclear power plant wiring can be fitted with a second mating polarized connector. The final connection can then be made between the first and second polarized connectors. The polarization of the first and second polarized connectors ensures that the replacement connection made in the nuclear power plant will be correctly polarized.

There are, however, the numerous difficulties in mechanical support, sealing, vibration, corrosion and the like described above in implementing connections in a nuclear plant environment, and these problems are made more complex by the introduction of the polarized connector as an add-on assembly. These problems are substantially relieved by the embodiments described below in the present disclosure.

FIG. 1 illustrates an exploded view of an instrument 100. The instrument 100 is connected to process flanges 102, 104. The process flanges 102, 104 are connected by pipe fittings 106, 108 to pressurized fluid lines (not illustrated in FIG. 1). The instrument 100 is connected by electrical connections (such as those shown in FIGS. 5, 6, 7, 8 and 9) to a field circuit in a nuclear installation.

The instrument 100 includes a sensor module 110. The sensor module 110 is connected to the process flange 104, 106 by bolts 112 and nuts 114. O-rings 116, 118 are compressed between the sensor module 110 and the process flanges 104, 106 to provide fluid seals.

The sensor module 110 includes a support conduit 120. The support conduit 120 has support conduit threads 122. The support conduit 120 carries a sensor output lead 124 in an internal conduit passageway. According to one embodiment, the sensor output lead 124 includes a multi-conductor electrical cable that provides energization to a pressure sensor in the sensor module and that provides a sensor output representative of process pressure sensed by the sensor module.

The term "support conduit" as used herein means an electrical wiring conduit that is rigidly mounted to a sensor module and that carries one or more electrical leads and that has threads that are capable of supporting a weight of a thermal and nuclear radiation shield for an instrument (such as the instrument 100).

The instrument 100 includes an electronic circuit 126. The electronic circuit 126 receives a sensor output from the sensor output lead 124. According to one embodiment, the electronic circuit 126 includes multiple circuit boards interconnected with one another by connector pins (not illustrated in FIG. 1).

The instrument 100 includes a connector 128 that is wired by wires 130 to the electronic circuit 126. The connector 128 is described in more detail below in connection with examples illustrated in FIGS. 5-9. The connector 128 includes a key 133. The key 133 is aligned with field circuit contacts of the connector 128 as described in more detail below in connection with FIGS. 8-9.

The instrument 100 includes a thermal and nuclear radiation shield 134 (134A, 134B, 134C). The thermal and nuclear radiation shield 134 includes a main body 134A and covers 134B, 134C that are threaded on the main body 134A. The thermal and nuclear radiation shield is described in more detail below in connection with FIG. 4.

The thermal and nuclear radiation shield 134 encloses the electronic circuit 126. The thermal and nuclear radiation shield 134 is shaped to include a shock protection annulus 136 (with an annulues axis 135) that protrudes from a main body 134A of the thermal and nuclear radiation shield 134. The connector 128 is secured inside the shock protection annulus 136. The connector 128 is a sealed feedthrough connector that is additionally sealed to the shock protection annulus 136.

The main body 134A is shaped to include shield threads 137 (hidden from view in FIG. 1) that rotatably engage the support conduit threads 122 to rotate an alignment of the key 133 relative to the process flanges 102, 104. The process flanges 102, 104 are rigidly mounted in the nuclear installation, and thus relative rotation between the support conduit threads 122 and the shield threads 137 adjusts an alignment of the key 133 relative to the nuclear installation. The connector 128 is located along an axis of rotation 138. Rotation of the thermal and nuclear radiation shield 134 rotates the direction of the key 133 relative to the axis of rotation 138. The key 133 can be aligned to point in any selected direction from 0 to 360 degrees. A lock nut 140 is provided to lock the selected direction for the key 133. The key 133 provides an alignment key which prevents mating of connectors that are not aligned to provide connections with correct polarization. The key 133 ensures that if connectors are mated that the polarization is correct.

Figure 3:
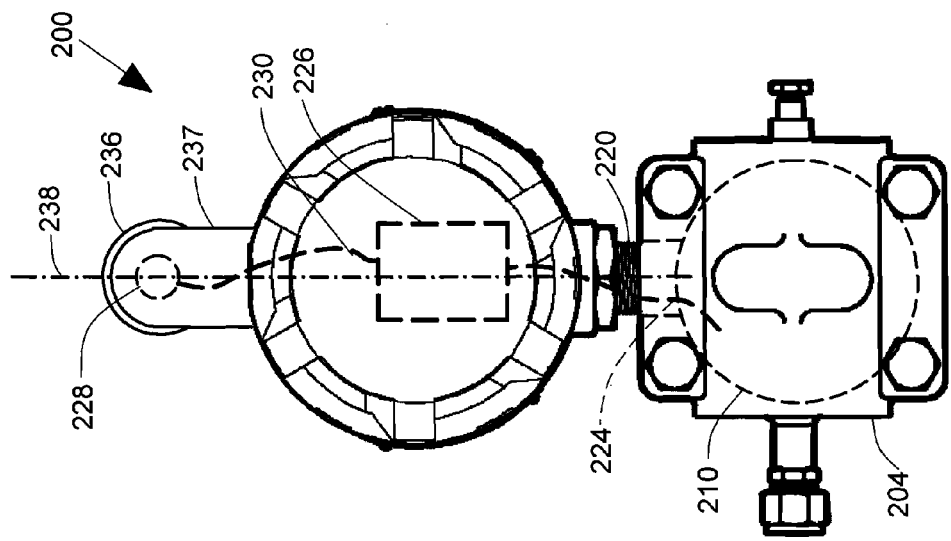
FIGS. 2-3 illustrate front and side views of an instrument that includes a bilocular thermal and nuclear radiation shield that includes a shock protection annulus with an elbow.
Figure 2:
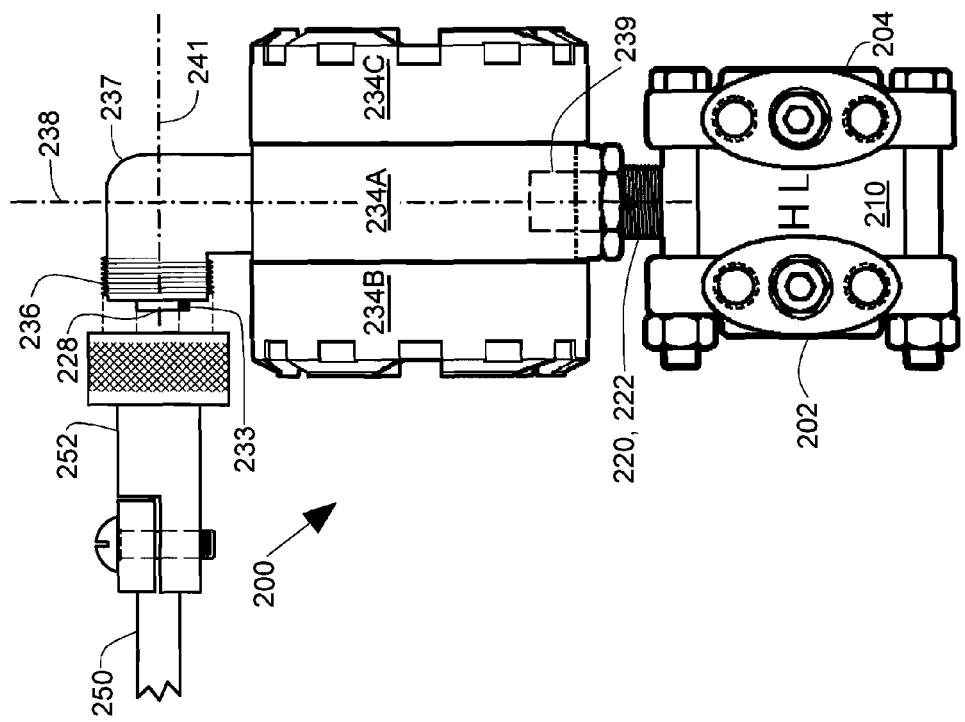

FIGS. 2-3 illustrate front and side views of an instrument 200. The instrument 200 is similar to the instrument 100 except in details associated with connectors and shock protection annuli. In FIGS. 2-3, a connector 228 (along an annulues axis 241) is not aligned with an axis of rotation 238, and a shock protection annulus 236 includes a bend or elbow turn 237. In FIG. 1, by comparison, the connector 128 is aligned along an axis of rotation 138, and the shock protection annulus 136 does not include a bend or elbow.

The instrument 200 connects to process flanges 202, 204. The instrument 200 connects to a field circuit 250 in a nuclear installation. The field circuit 250 includes a field circuit electrical connector 252. The field circuit electrical connector 252 mates with the connector 228 and the shock protection annulus 236 on the instrument 200.

A sensor module 210 is connected to the process flanges 202, 204. The sensor module 210 includes a support conduit 220 that has support conduit threads 222. The support conduit 220 carries a sensor output lead 224.

An electronic circuit 226 receives a sensor output from the sensor output lead 224. The connector 228 is wired to the electronic circuit 226 by wires 230. The connector 228 includes a key 233. The key 233 is aligned with field circuit contacts of the connector 228. The key 233 engages a similarly aligned key slot (not illustrated) in the field circuit electrical connector 252 to ensure that electrical connection polarity cannot be accidentally reversed.

A thermal and nuclear radiation shield 234A, 234B, 234C encloses the electronic circuit 226. A main body 234A of the thermal and nuclear radiation shield is shaped to include the shock protection annulus 236 that protrudes from the main body 234A of the thermal and nuclear radiation shield. The connector 228 is secured inside the shock protection annulus 236. The main body 234A is shaped to include shield threads 239 that rotatably engage the support conduit threads 222 to rotate an alignment of the key 233 relative to the process flanges 202, 204.

Figure 4:
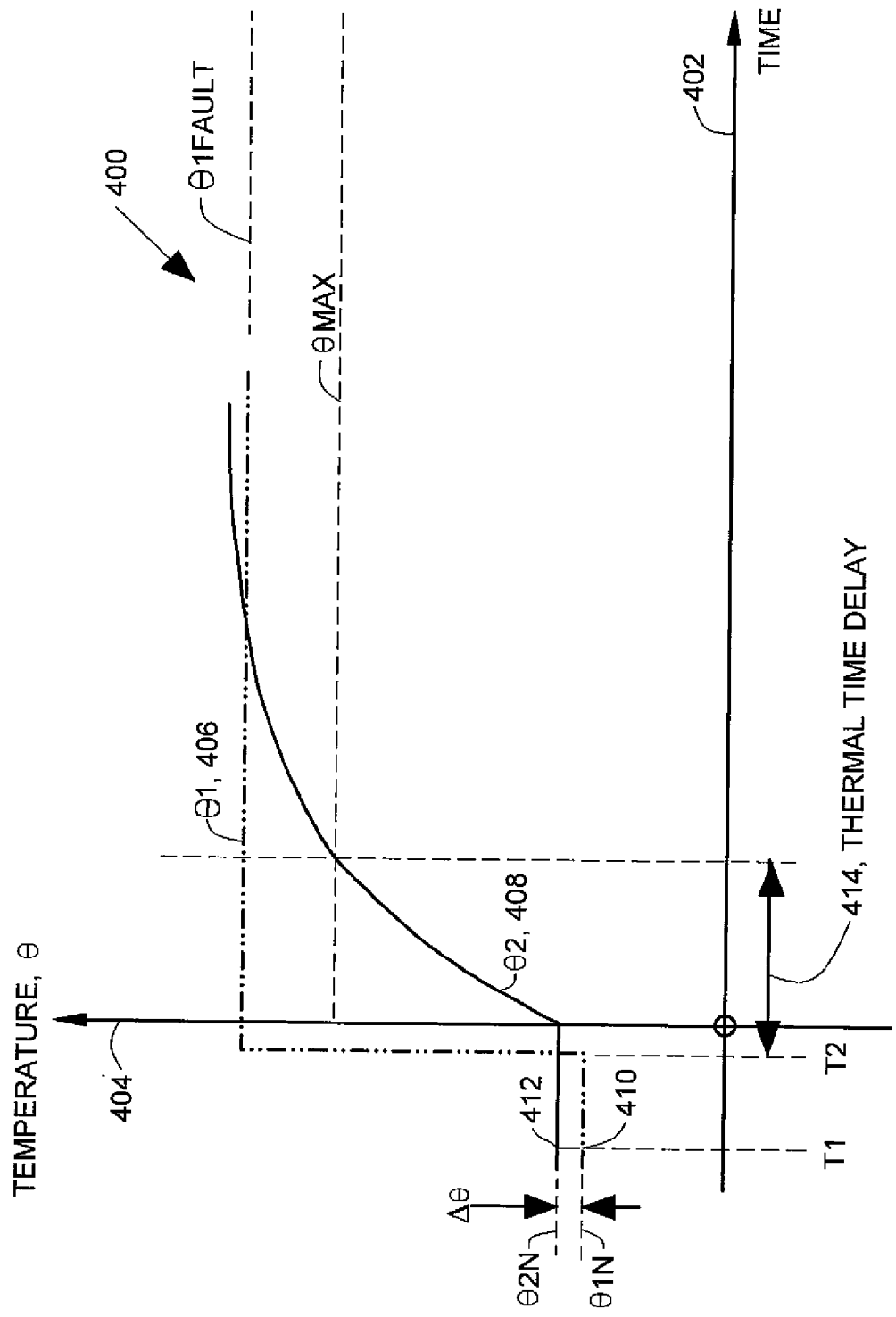
FIG. 4 illustrates an exemplary graph of temperatures as a function of time in connection with thermal shielding of electronics in an instrument.

FIG. 4 illustrates an exemplary graph 400 of temperatures as a function of time. FIG. 4 illustrates functioning of a nuclear and radiation shield in delaying overheating of an electronic circuit after a large ambient temperature transient during a fault condition in a nuclear installation.

A horizontal axis 402 represents time T. A vertical axis 404 represents temperature $\theta$. A first data plot 406 represents an exemplary ambient atmospheric temperature $\theta 1$ surrounding a nuclear instrument (for example, instruments shown in FIGS. 1, 2, 3) in a nuclear installation. A second data plot 408 represents a temperature $\theta 2$ of an electronic circuit (such as electronic circuits 126, 226 in FIGS. 1, 3) inside a thermal and nuclear radiation shield (such as thermal and nuclear radiation shields 134A, B, C and 234 A, B, C) in the atmosphere.

Under normal operating conditions at time T=T1, the atmosphere is at a normal atmospheric temperature $\theta 1N$ at 410, and the electronic circuit is at a normal electronic circuit temperature $\theta 2N$ at 412. In this example, the electronic circuit is continuously energized and dissipating electrical power, and there is a normal temperature rise $\Delta 9$ above ambient atmospheric temperature for the electronic circuit.

At time T=T2, a fault condition occurs in the nuclear installation. The fault causes ambient atmospheric temperature $\theta 1$ to rise abruptly to a high temperature $\theta 1$fault. The temperature $\theta 1$fault is higher than a maximum permissible operating temperature $\theta$max for the electronic circuit. The electronic circuit fails to provide a reliably accurate instrument output at temperatures above $\theta$max.

The thermal and nuclear radiation shield includes metal and has a metal wall thickness that is at least 10 millimeters thick. According to one embodiment, the metal wall thickness is at least 10 millimeters, and the thermal and nuclear radiation shield has a heat capacity of at least 2000 Joules per degree Centigrade. The heat capacity can be approximated by the specific heat capacity of the metal multiplied by the mass of the metal used in the thermal and nuclear radiation shield. The large heat capacity of the thermal and nuclear radiation shield provides a desirable thermal time delay 414 for heating of the electronic circuit under fault conditions. The thermal time delay 414 provides time after the start of a fault condition for technical personnel of the nuclear installation to obtain accurate process variable data from the instrument before the electronic circuit temperature exceeds $\theta$max. In one embodiment, the thermal time delay 414 for a 50 degree centigrade rise in ambient temperature is at least 60 seconds of time.

Figure 5:
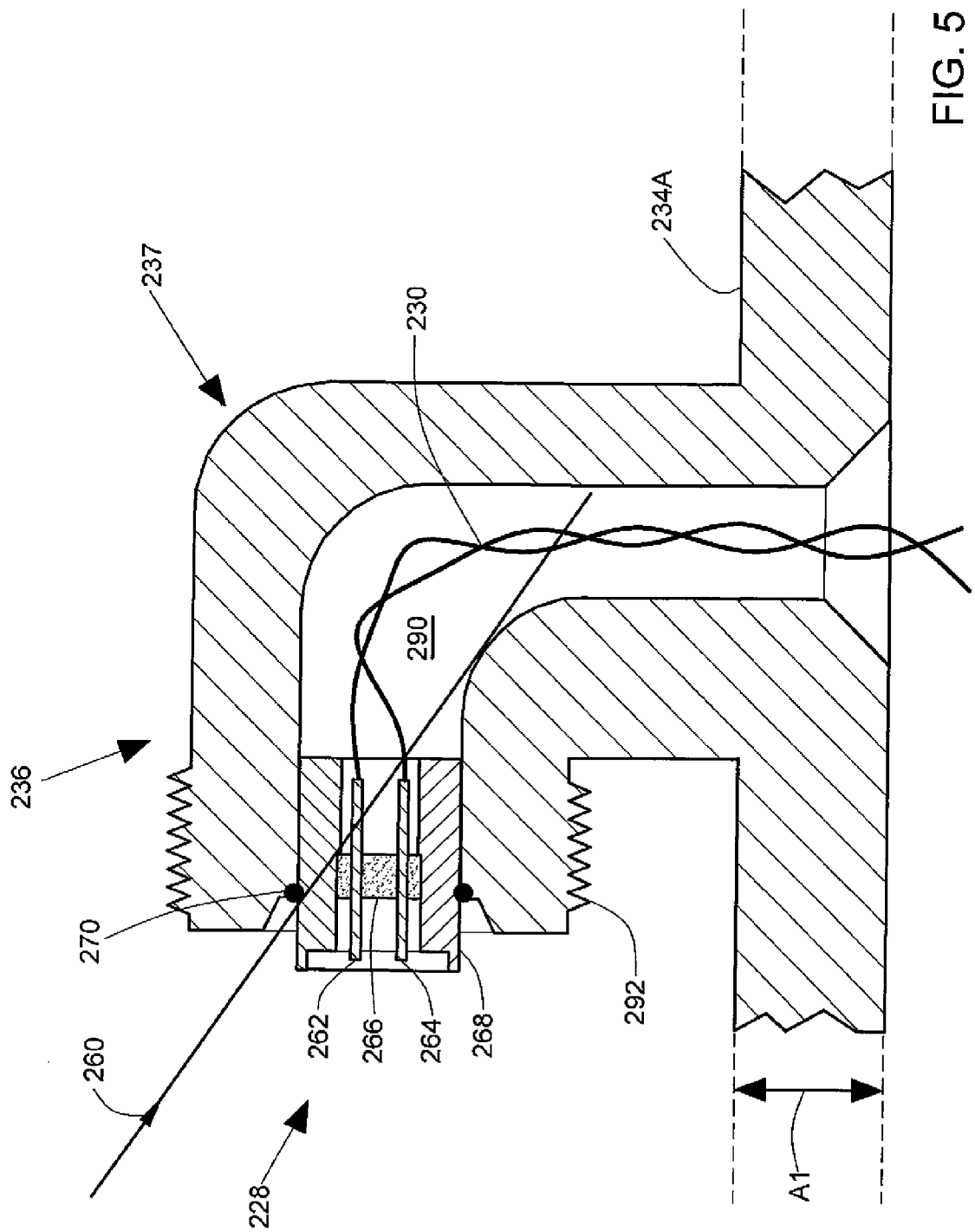
FIG. 5 illustrates an enlarged cross-sectional view of an embodiment of a shock protection annulus with an elbow such as the elbow shown in FIGS. 2-3.

FIG. 5 illustrates an enlarged cross-sectional view of an example embodiment of the shock protection annulus 236, the elbow turn 237, the connector 228 and main body 234A discussed above in connection with FIGS. 2, 3.

The main body 234A has a metal wall thickness A1. The thickness A1 provides thermal heat capacity and thermal time delay 414 as discussed above in connection with FIG. 4. The wall thickness A1 also provides attenuation of nuclear radiation. According to one embodiment, the wall thickness provides attenuation of nuclear radiation impinging on the electronics by at least 10%. The attenuation of the nuclear radiation protects the electronic circuit 228 (FIG. 3) inside the shield from radiation damage.

The elbow turn 237 avoids an unshielded straight line air path into the electronics circuit 228 (FIG. 3) for nuclear radiation 260 in FIG. 5.

In FIG. 5, the connector 228 includes contact pins 262, 264. The contact pins 262, 264 are supported in an electrically insulating feedthrough 266. The feedthrough 266 is supported in a connector shell 268. The electrically insulating feedthrough 266 includes a hermetic seal to the contact pins 262, 264 and the connector shell 268. According to one embodiment, the electrical insulating feedthrough includes a glass-to-metal seal. According to another embodiment, the connector shell 268 includes metal and is welded to the support annulus 236 with an annular weld 270. The connector 228 includes a key (not illustrated in FIG. 5) and examples of such keys are described in more detail below in connection with FIGS. 8 and 9.

Figure 6:
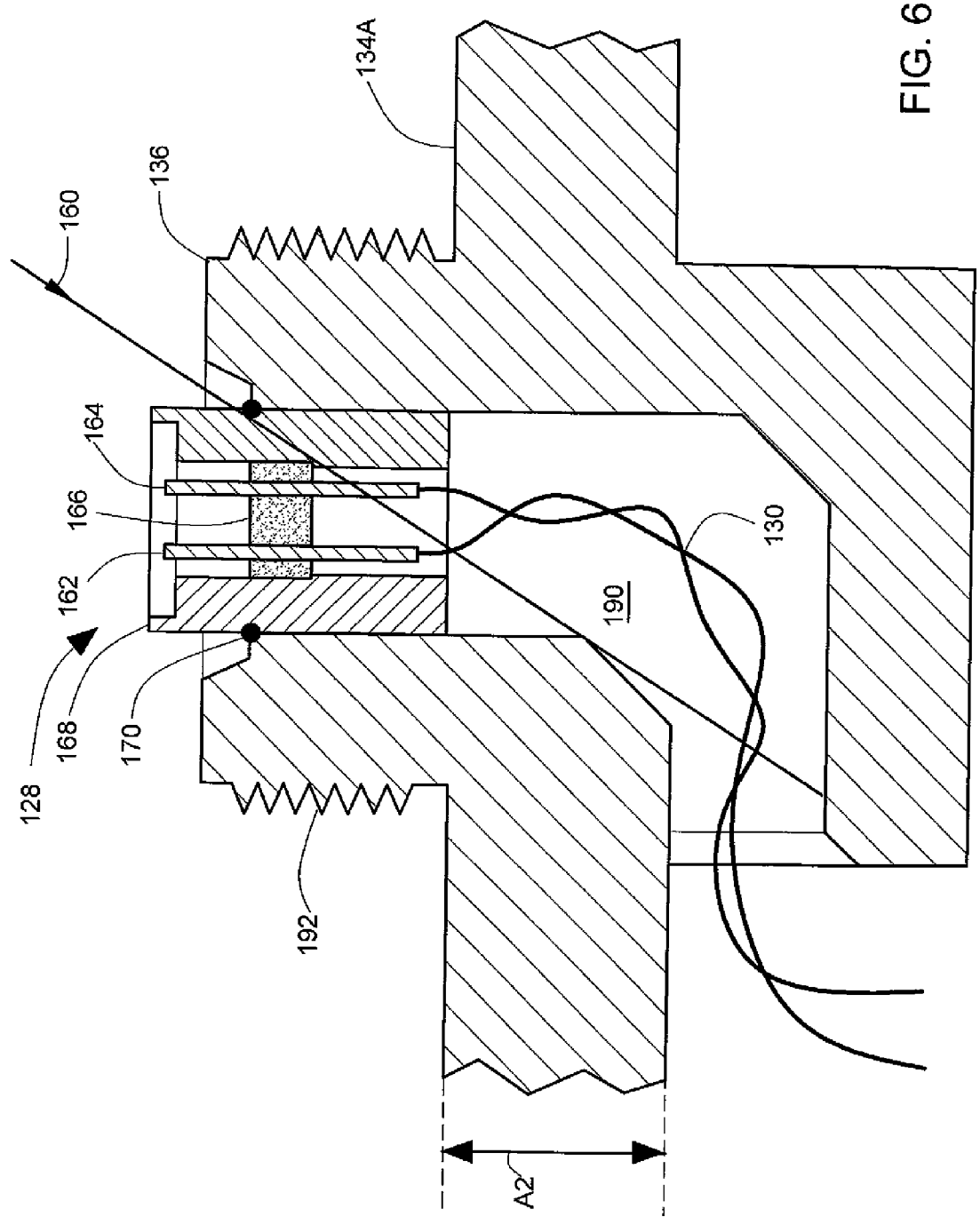
FIG. 6 illustrates an enlarged cross-sectional view of a straight shock protection annulus such as the shock protection annulus shown in FIG. 1.

FIG. 6 illustrates an enlarged cross-sectional view of an example embodiment of the shock protection annulus 136, the connector 128 and main body 134A discussed above in connection with FIG. 1.

The main body 134A has a metal wall thickness A2. The thickness A2 provides thermal heat capacity and thermal time delay 414 as discussed above in connection with FIG. 4. The wall thickness A2 also provides attenuation of nuclear radiation. According to one embodiment, the wall thickness provides attenuation of nuclear radiation impinging on the electronics by at least 10%. The attenuation of the nuclear radiation protects the electronic circuit 228 (FIG. 3) inside the shield from radiation damage.

An elbow turn 190 that is formed as part of the main body 134A avoids an unshielded straight line air path into the electronics circuit 128 (FIG. 1) for nuclear radiation 160 in FIG. 6.

In FIG. 6, the connector 128 preferably includes contact pins 162, 164. The contact pins 162, 164 are supported in an electrically insulating feedthrough 166. The feedthrough 166 is supported in a connector shell 168. The electrically insulating feedthrough 166 includes a hermetic seal to the contact pins 162, 164 and the connector shell 168. According to one embodiment, the electrical insulating feedthrough 166 includes a glass-to-metal seal. According to another embodiment, the connector shell 168 includes metal and is welded to the support annulus 136 with an annular weld 170. The connector 128 includes a key (not illustrated in FIG. 6) and examples of such keys are described in more detail below in connection with FIGS. 8 and 9.

FIG. 7 illustrates an enlarged cross-sectional view of an example embodiment of a shock protection annulus 736, an elbow turn 737, a connector 728 and main body 734A. The embodiment shown in FIG. 7 is similar to the embodiment shown in FIG. 6, except that the shock protection annulus 737 includes protruding pins 780, 782 that engage (thread into) a standard "quick connect" mating connector (not illustrated in FIG. 7) that is part of field wiring. The standard quick connect mating connector includes a threaded groove of approximately one quarter turn. The pins 780, 782 comprise vestigial threads that engage the quarter turn thread on the mating connector as an outer shell of the quick connect mating connector is rotated one quarter turn. According to one embodiment, a wave washer 784 is provided adjacent the shock protection annulus 736. The wave washer 784 is compressed between the shock protection annulus 736 and the quick connect mating connector to help secure the quick connect mating connector to the shock protection annulus 736.

Figure 8:
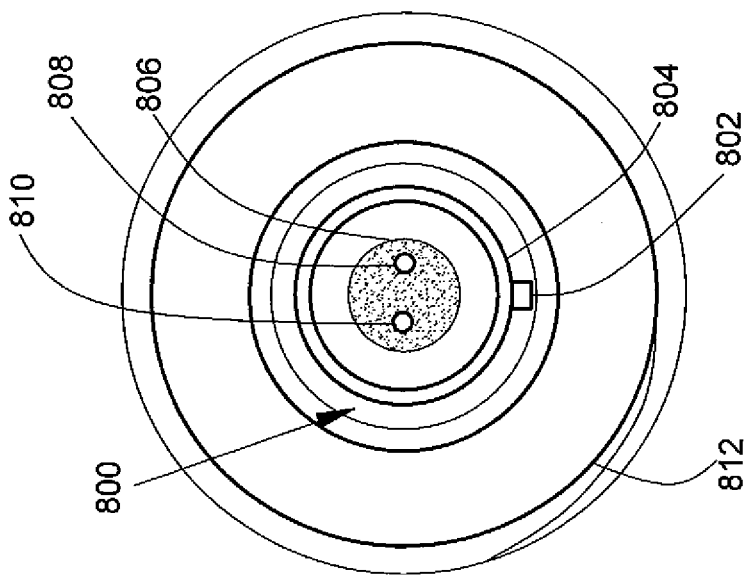
FIG. 8 illustrates an embodiment of a connector that in which a key is mounted on a connector shell.

FIG. 8 illustrates an embodiment of a connector 800 that includes a key 802 that is mounted on a connector shell 804. The connector shell 804 surrounds a feedthrough insulator 806. A positive contact pin 808 and a negative contact pin 810 are sealed into the feedthrough insulator 806. The key 802 is mounted in a fixed position relative to the contact pins 808 and 810. When the connector 800 is joined or mated with a field circuit electrical connector (such as connector 252 in FIG. 2), the key 802 slides into a correspondingly shaped slot in the field electrical connector, ensuring a unique alignment that maintains proper polarity connections. The connector shell 804 is welded inside a surrounding shock protection annulus 812.

Figure 9:
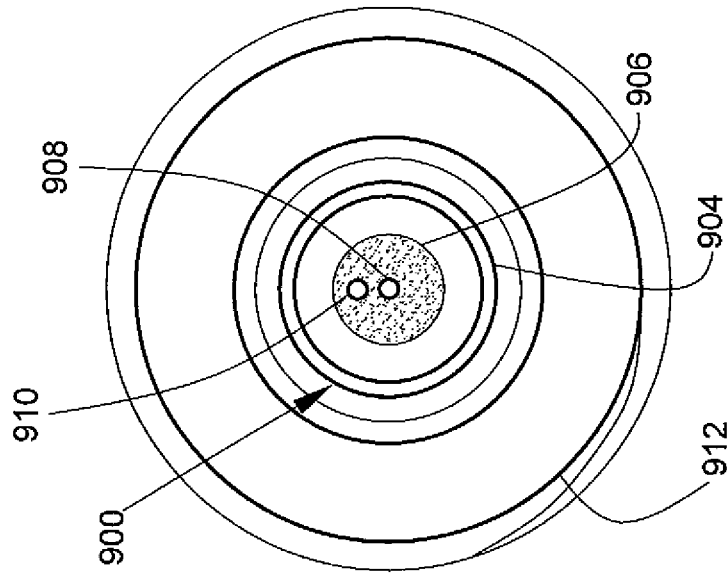
FIG. 9 illustrates an embodiment of a connector with contact pins that are mounted in an offset position relative to a shell to function as a key.

FIG. 9 illustrates an embodiment of a connector 900 with a connector shell 904. The connector shell 904 surrounds a feedthrough insulator 906. A positive contact pin 908 and a negative contact pin 910 are sealed into the feedthrough insulator 906. The contact pins 908, 910 are mounted in an offset position relative to the shell 904. The offset contact pins 908, 910 function as a key. When the connector 900 is joined or mated with a field circuit electrical connector (such as connector 252 in FIG. 2), the contact pins 908, 910 slide into a correspondingly offset sockets in the field electrical connector, ensuring a unique alignment that maintains proper polarity connections. The connector shell 904 is welded inside a surrounding shock protection annulus 912.

Figure 11:
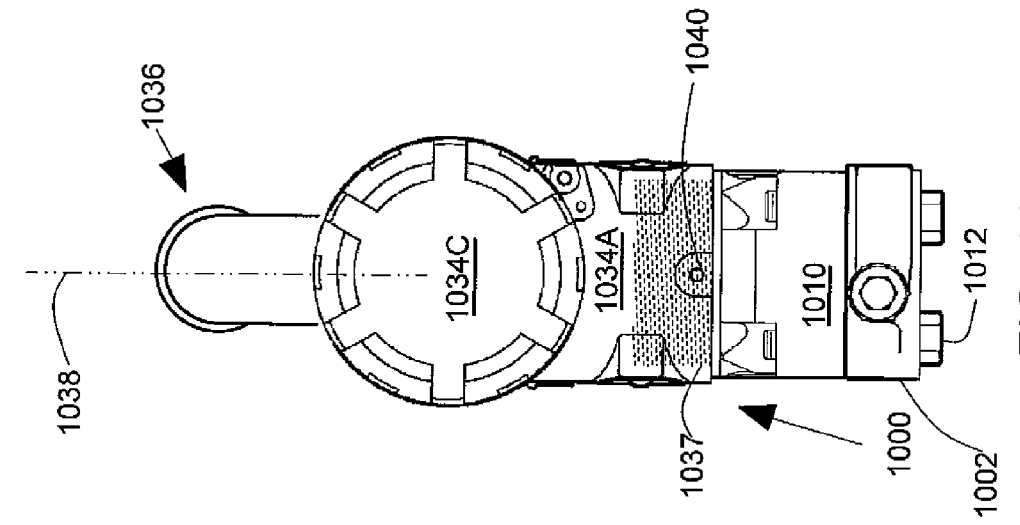
FIGS. 10, 11, 12 illustrate an embodiment of an instrument with a bilocular thermal and nuclear radiation shield and a shock protection annulus that includes an elbow, and with a coplanar process inlet adapted to mount to a coplanar process flange.
Figure 10:
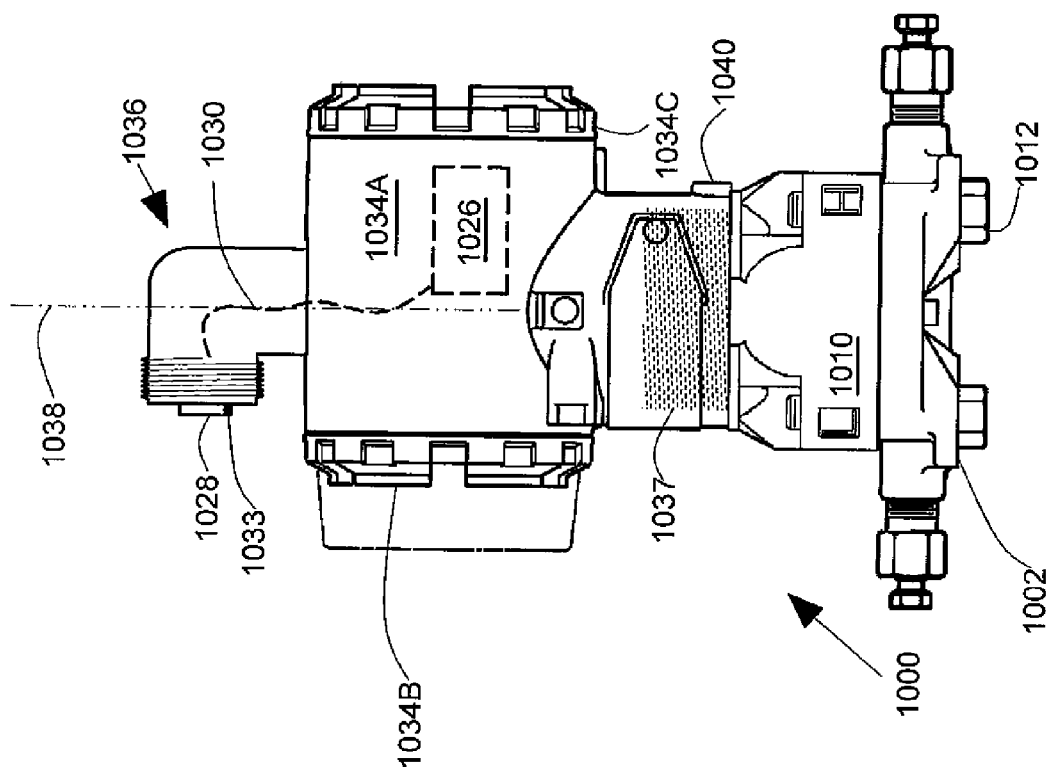
Figure 12:
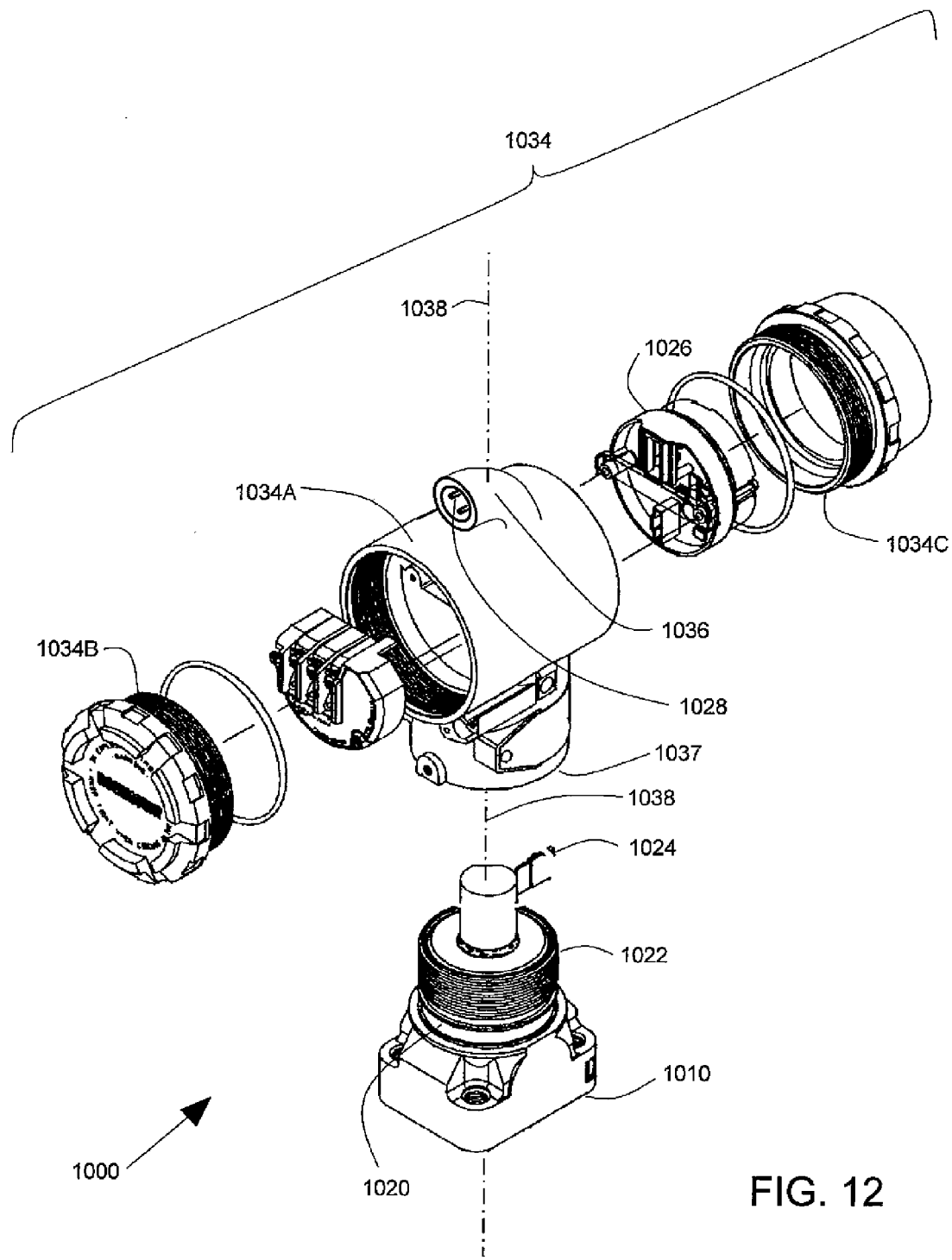

FIGS. 10, 11 illustrate an alternative embodiment of an instrument 1000. FIG. 12 illustrates an exploded view of the instrument 1000. The instrument 1000 is connected to a coplanar process flange 1002. The coplanar process flange 1002 is connected by pipe fittings (not illustrated) to pressurized fluid lines (not illustrated). The instrument 1000 is connected by electrical connections (such as those shown in FIG. 5, 6, 7, 8 or 9) to a field circuit in a nuclear installation.

The instrument 1000 includes a sensor module 1010 with a coplanar process inlet that mates with a coplanar process flange. The sensor module 1010 is connected to the coplanar process flange 1002 by bolts 1012. The sensor module 1010 includes a support conduit 1020. The support conduit 1020 has support conduit threads 1022. The support conduit 1020 carries a sensor output lead 1024 in an internal conduit passageway. According to one embodiment, the sensor output lead 1024 includes a multi-conductor electrical cable that provides energization to a pressure sensor in the sensor module and that provides a sensor output representative of process pressure sensed by the sensor module.

The instrument 1000 includes an electronic circuit 1026. The electronic circuit 1026 receives a sensor output from the sensor output lead 1024. The instrument 1000 comprises a connector 1028 that is wired by wires 1030 to the electronic circuit 1026. The connector 1028 is described in more detail above in connection with examples illustrated in FIGS. 5-9.

The instrument 1000 includes a thermal and nuclear radiation shield 1034 (1034A, 1034B, 1034C). The thermal and nuclear radiation shield 1034 includes a main body 1034A and covers 1034B, 1034C that are threaded on the main body 1034A. The thermal and nuclear radiation shield is described in more detail above in connection with FIGS. 4, 5, 6, 7, 8 and 9.

The thermal and nuclear radiation shield 1034 encloses the electronic circuit 1026. The thermal and nuclear radiation shield 1034 is shaped to include a shock protection annulus 1036 that protrudes from a main body 1034A of the thermal and nuclear radiation shield 1034. The connector 1028 is secured inside the shock protection annulus 1036.

The main body 1034A is shaped to include shield threads 1037 (hidden from view in FIG. 12) that rotatably engage the support conduit threads 1022 to rotate an alignment of the key 1033 relative to the coplanar process flange 1002. The coplanar process flange 1002 is rigidly mounted in the nuclear installation, and thus relative rotation between the support conduit threads 1022 and the shield threads 1037 adjusts an alignment of the key 1033 relative to the nuclear installation. The connector 1028 is located proximate an axis of rotation 1038. Rotation of the thermal and nuclear radiation shield 1034 rotates the direction of the key 1033 relative to the axis of rotation 1038. The key 1033 can be aligned to point in any selected direction from 0 to 360 degrees. A setscrew 1040 is provided to lock the selected direction for the key 1033.

Figure 13:
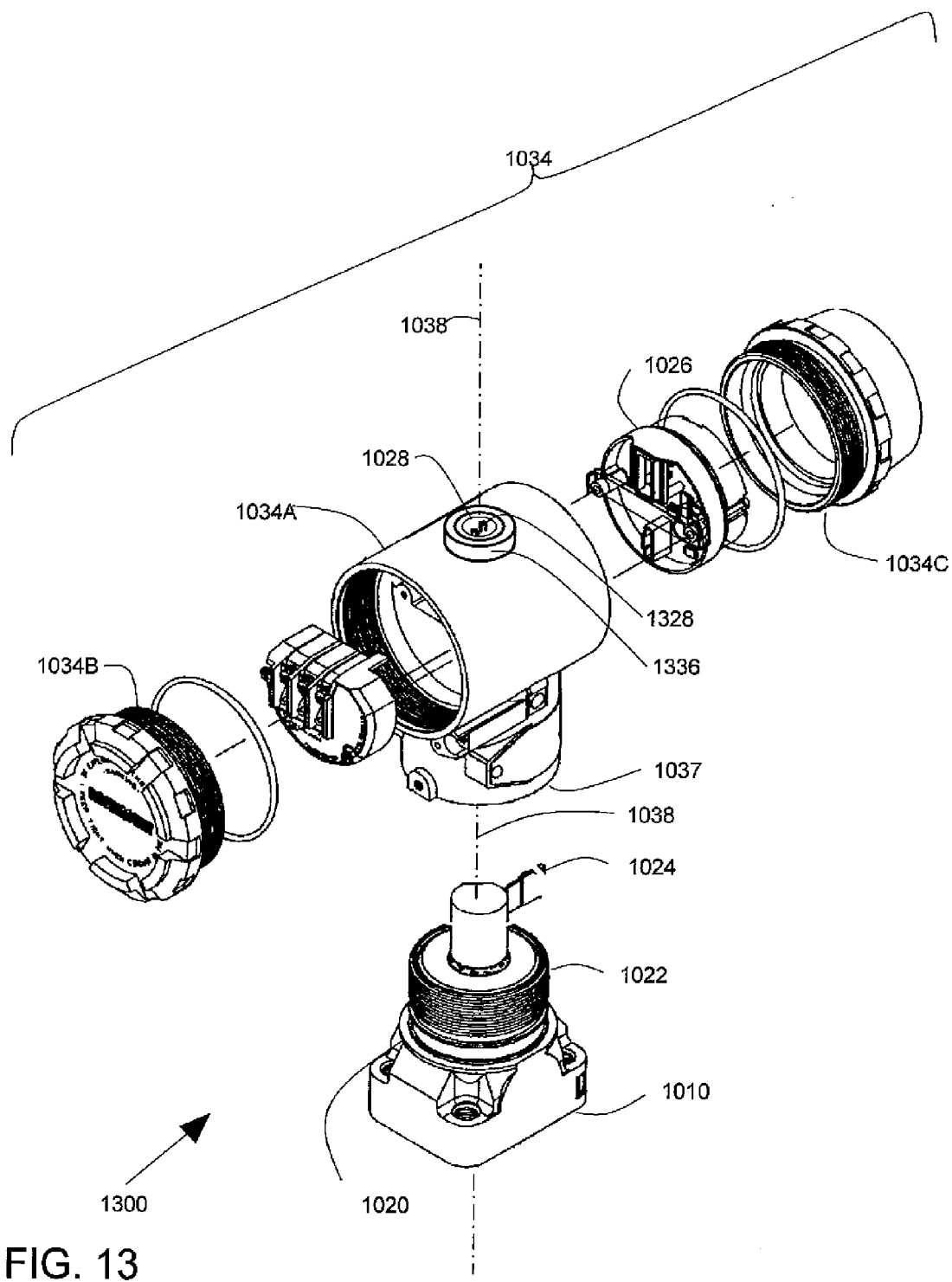
FIG. 13 illustrates an embodiment of an instrument with a bilocular thermal and nuclear radiation shield, a straight shock protection annulus, and with a coplanar process inlet adapted to mount to a coplanar process flange.

FIG. 13 illustrates an instrument 1300 that is the same as the instrument 1000 shown in FIGS. 10-12, except that the instrument 1300 includes a shock protection annulus 1336 that is straight (similar to FIG. 6). The shock protection annulus 1336 surrounds a connector 1328. In other respects, the instrument 1300 and the instrument 1000 are the same.

Figure 14:
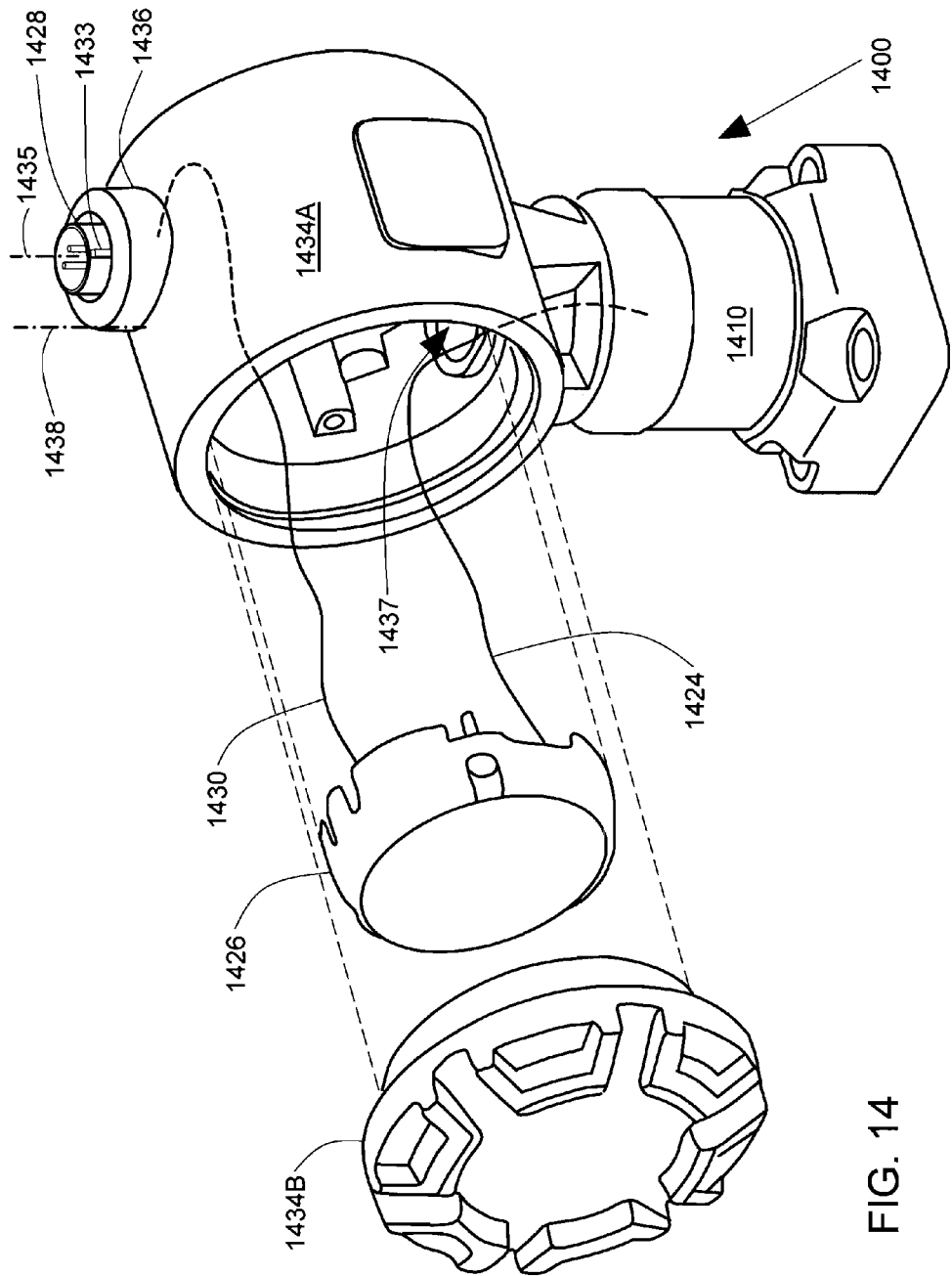
FIGS. 14, 15, 16 illustrate an embodiment of an instrument with a unilocular thermal and nuclear radiation shield, a straight shock protection annulus, and with a coplanar process inlet adapted to mount to a coplanar process flange.
Figure 15:
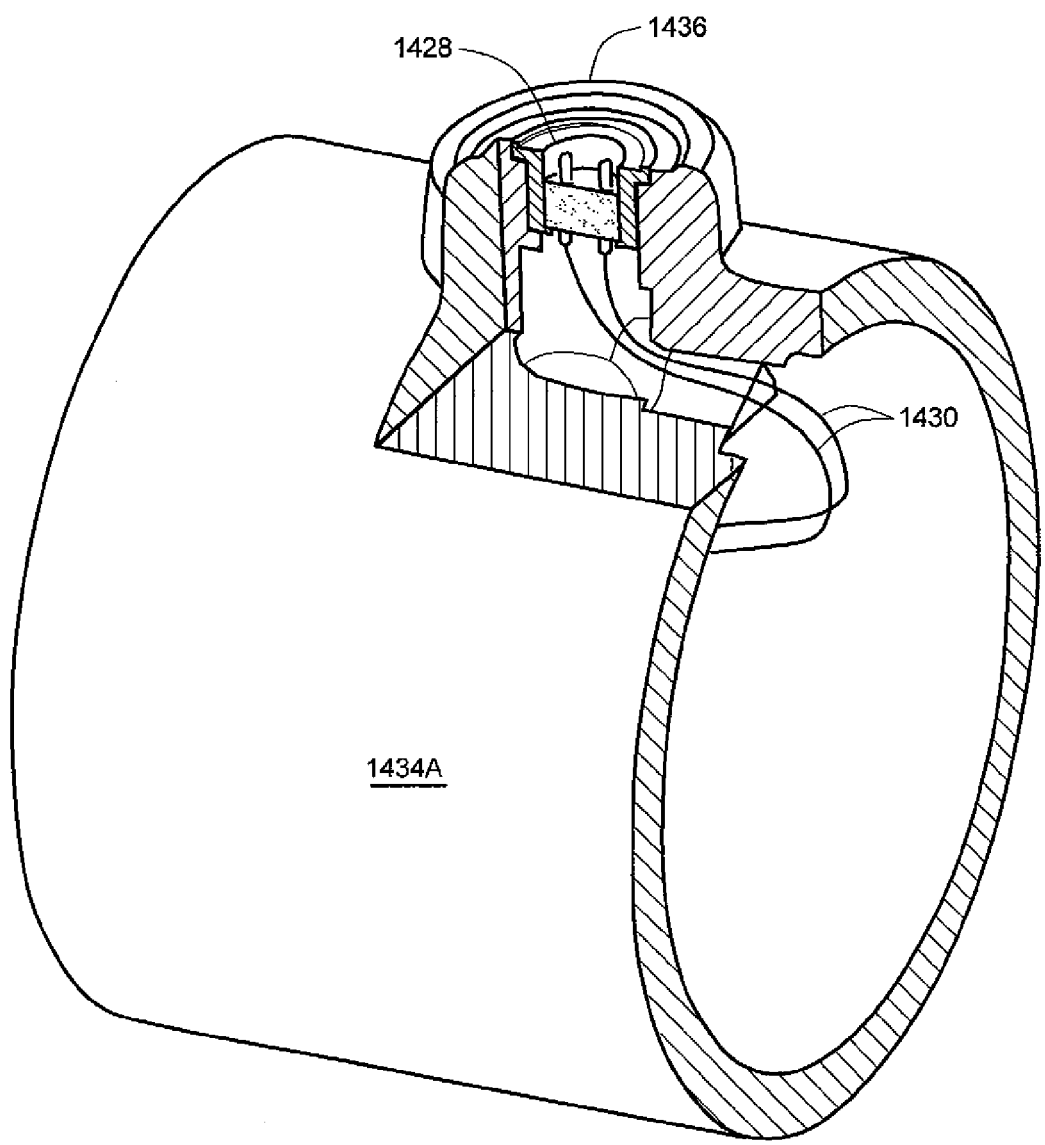
Figure 16:
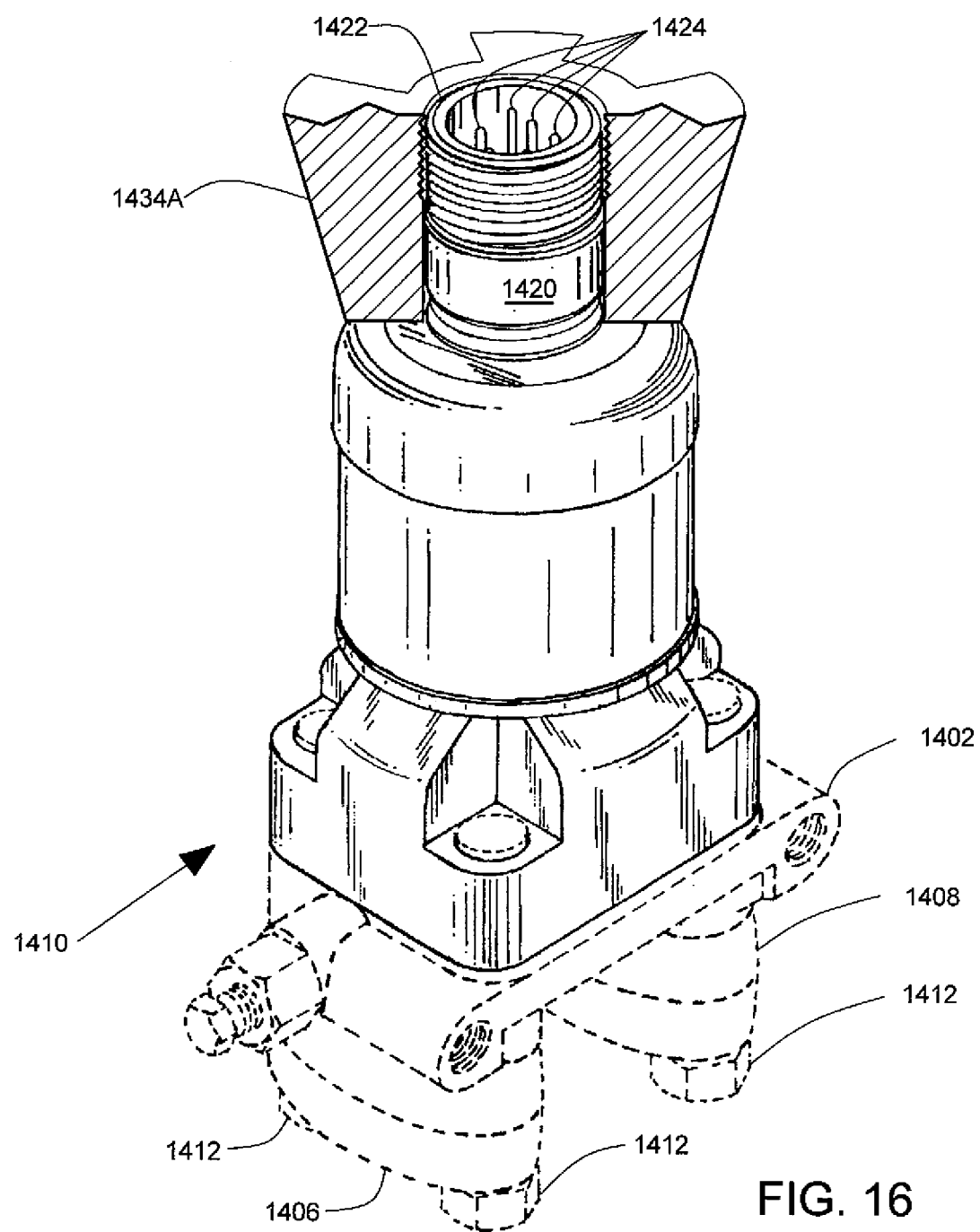

FIGS. 14, 15, 16 illustrate an instrument 1400. FIG. 14 illustrates an exploded view. FIG. 15 illustrates a cut-away view of a main body 1434A of a thermal and nuclear radiation shield. FIG. 16 illustrates a sensor module 1410.

The instrument 1400 is connected to a process flange 1402. The process flange 1402 is connected by pipe fittings 1406, 1408 to pressurized fluid lines (not illustrated in FIG. 16). The instrument 1400 is connected by electrical connections (such as those shown in FIGS. 5, 6, 7 and 8) to a field circuit in a nuclear installation.

As illustrated in FIG. 16, the sensor module 1410 is connected to the process flange 1402 by bolts 1412. The sensor module 1410 includes a support conduit 1420. The support conduit 120 has support conduit threads 1422. The support conduit 1420 carries sensor output leads 1424 in an internal conduit passageway. According to one embodiment, the sensor output leads 1424 includes a multi-conductor electrical connector that provides energization to a pressure sensor in the sensor module and that provides a sensor output representative of process pressure sensed by the sensor module.

As illustrated in FIG. 14, the instrument 1400 includes an electronic circuit 1426. The electronic circuit 1426 receives a sensor output from the sensor output lead 1424. According to one embodiment, the electronic circuit 1426 includes multiple circuit boards interconnected with one another by connector pins (not illustrated in FIG. 14).

The instrument 1400 includes a connector 1428 that is wired by wires 1430 to the electronic circuit 1426. The connector 1428 is described in more detail above in connection with examples illustrated in FIGS. 5-9. The connector 1428 includes a key 1433. The key 1433 is aligned with field circuit contacts of the connector 1428 as described in more detail above in connection with FIGS. 8-9.

The instrument 1400 includes a thermal and nuclear radiation shield 1434 (1434A, 1434B). The thermal and nuclear radiation shield 1434 includes a main body 1434A and a cover 1434B that is threaded on the main body 1434A. The main body 1434A includes a single compartment that is accessed by the single cover 1434B. The thermal and nuclear radiation shield 1434 is described in more detail above in connection with FIG. 4.

The thermal and nuclear radiation shield 1434 encloses the electronic circuit 1426. The thermal and nuclear radiation shield 1434 is shaped to include a shock protection annulus 1436 (with an anuulues axis 1435) that protrudes from a main body 1434A of the thermal and nuclear radiation shield 1434. The connector 1428 is secured inside the shock protection annulus 1436.

The main body 1434A is shaped to include shield threads 1437 (partially hidden from view in FIG. 1) that rotatably engage the support conduit threads 1422 (FIG. 16) to rotate an alignment of the key 1433 relative to the process flanges 1402. The process flange 1402 is rigidly mounted in the nuclear installation, and thus relative rotation between the support conduit threads 1422 and the shield threads 1437 adjusts an alignment of the key 1433 relative to the nuclear installation. Rotation of the thermal and nuclear radiation shield 1434 rotates the direction of the key 1433 relative to an axis of rotation 1438. The key 1433 can be aligned to point in any selected direction from 0 to 360 degrees.

FIGS. 17-18 illustrate front and side views of an instrument 1700. The instrument 1700 is similar to the instrument 200 illustrated in FIGS. 2-3, except that the instrument 1700 includes a sensor module 1710 that is enclosed in a thermal and nuclear radiation shield 1702. The sensor module 1710 includes electronic circuits that are protected from heating and nuclear radiation by the thermal and nuclear radiation shield 1702. The thermal and nuclear radiation shield 1702 has a minimum thickness A3 that is at least 10 millimeters. The thermal and nuclear radiation shield 1702 also includes pipe fittings 1706, 1708 for connection to process pressure lines. The thermal and nuclear radiation shield 1702 is shaped to function as a process flange and has internal fluid passageways that carry process pressures from the pipe fittings 1706, 1708 to the sensor module 1710. In other respects, the instrument 1700 is similar to the instrument 200.

According to one embodiment, in each of the instruments 100, 200, 1000, 1300, 1400, the main body (134A, 234A, 1034A, 1434A) includes a wiring passageway (such as passageways 190, 290, 790 in FIGS. 5, 6, 7) that includes a turn so that there is no straight line radiation path through the wiring passageway, and wiring from the connector to the electronic circuit passes through the wiring passageway.

According to one aspect of a preferred embodiment, in each of the instruments 100, 200, 1000, 1300, 1400, 1700, the main body (134A, 234A, 1034A, 1434A, 1734A) includes a metal shield with a wall thickness of more than 10 millimeters. The wall thickness of more than 10 millimeters provides a thermal mass that delays a temperature increase of the electronic circuit due to increase of a temperature of an atmosphere surrounding the instrument by a thermal time constant of at least 60 seconds. According to another embodiment, the metal shield attenuates nuclear radiation impinging on the electronic circuit by at least 10%.

According to one aspect of a preferred embodiment, in each of the instruments 100, 200, 1000, 1300, 1400, 1700 the shock protection annulus (136, 236, 736, 1036, 1336, 1436) has a wall thickness of at least 10 millimeters and remains intact when the instrument is subjected to vibration of 9.5 G.

According to one embodiment, in each of the instruments 100, 1300, 1400, the shock protection annulus (136, 1336 1436) has an annulus axis that is parallel to an axis of rotation of the shield threads, and the rotation of the shield adjusts a rotational direction of the key. According to another embodiment, in each of the instruments 200, 1000, 1700 the shock protection annulus includes an elbow and has an annulus axis that is transverse to the rotation axis, and the rotation of the main body adjusts a direction in which the connector faces.

According to one embodiment, in each of the instruments 100, 200, 1000, 1300, 1400, 1700, the shock protection annulus (136, 236, 736, 1036, 1336, 1436) and the main body (134A, 234A, 1034A, 1434A are formed of stainless steel.

According to one embodiment, in each of the instruments 100, 200, 1000, 1300, 1400, 1700, the shock protection annulus (136, 236, 736, 1036, 1336, 1436) includes an external annulus surface that includes threads (such as threads 192, 292 in FIGS. 5, 6).

According to one embodiment, in each of the instruments 100, 200, 1000, 1300, 1400, 1700, the shock protection annulus (136, 236, 736, 1036, 1336, 1436) includes an external annulus surface that is alternatively shaped to engage a twist-on connector as shown in FIG. 7.

According to one embodiment, in each of the instruments 100, 200, 1000, 1300, 1400, 1700, the shock protection annulus (136, 236, 736, 1036, 1336, 1436) includes a thrust ring surface 794 adapted to receive a wave spring 784.

According to one embodiment, in each of the instruments 100, 200, 1000, 1300, 1400, 1700, the main body and the shock protection annulus 136, 236, 1036, 1336, 1436 are a single seamless casting.

According to one embodiment, the thermal and nuclear radiation shield 134, 234 1434 includes at least one threaded shield cover 134B, 134C, 234B, 234C, 1034B, 1034C, 1434B that engages threads on the main body 134A, 234A, 1034A 1434A.

According to one embodiment, the thermal and nuclear radiation shield 1434 is unilocular, in other words, includes a single electronics and wiring cavity or compartment that is closed by a single cover 1434B. According to another embodiment, the thermal and nuclear radiation shield 134, 234, 1034 is at least bilocular, in other words at least two cavities, a first cavity for electronics and a second cavity for wiring. The first and second cavities are separated by a wall in the shield that includes a feedthrough connector for electrical connections.

According to one embodiment, the connector 128, 228, 728, 800, 900, 1028, 1328, 1428 includes a connector body such as connector shell 168, 268, 728 that is welded to the shock protection annulus 136, 236, 736.

It is to be understood that even though numerous characteristics and advantages of various embodiments of the invention have been set forth in the foregoing description, together with details of the structure and function of various embodiments of the invention, this disclosure is illustrative only, and changes may be made without departing from the scope and spirit of the present invention. It will be appreciated by those skilled in the art that the present teachings can be applied to other instruments, without departing from the scope and spirit of the present invention.

What is claimed is:

1. A process variable transmitter for use in measuring a process variable in a nuclear power plant facility, comprising:
 a sensor module configured to couple to process piping of the nuclear power plant, the sensor module including a process variable sensor configured to sense a process variable comprising a process pressure of the nuclear power plant and provide a sensor output;
 sensor circuitry in the sensor module which receives the sensor output from the process variable sensor;
 transmitter circuitry coupled to the sensor circuitry configured connect to a field circuit to power the process variable transmitter and to provide a process variable transmitter output on the field circuit related to the sensed process variable;
 a single-casting housing rotatably coupled to the sensor module comprising a thermal and nuclear radiation shield which surrounds the transmitter circuitry, the single-casting housing including a shock protection annulus which protrudes from the housing and is formed integrally therewith from a single piece of material wherein an entirety of the shock protection annulus protrudes outside from a main body of the housing the shock protection annular defining a wiring passageway that includes a turn which defines a connection elbow that provides radiation attenuation by blocking a straight line radiation path through the wiring passageway; and
 a connector formed inside of the shock protection annulus including a connector shell sealed to the shock protection annulus by an annular weld seal, the connector including at least two electrical pins extending through the shock protection annulus from an interior of the housing to an exterior of the housing and mounted in the connector shell with a glass to metal seal, wherein the at least two electrical pins connect the transmitter circuitry to the field circuit and wiring from the connector to the transmitter circuitry passes through the wiring passageway.

2. The process variable transmitter of claim 1 including an electrical connector which plugs into the at least two pins and is secured to the shock protection annulus.

3. The process variable transmitter of claim 2 wherein the electrical connector includes a threadable sleeve which is threadably received by the shock protection annulus.

4. The process variable transmitter of claim 2 wherein the electrical connector includes a threadable sleeve which is threadably received by the shock protection annulus.

5. The process variable transmitter of claim 1 wherein the seamless housing comprises a metal shield with a wall thickness of more than 10 millimeters.

6. The process variable transmitter of claim 1 wherein the shock protection annulus comprises an external annulus surface that is shaped to engage a twist-on connector.

7. The process variable transmitter of claim 6 wherein the annulus includes a thrust ring surface adapted to receive a wave spring.

8. The process variable transmitter of claim 1 including at least one end cap configured to seal an end of the seamless housing.

9. The process variable transmitter of claim 1 wherein the connector is carried in the connection elbow formed integrally with the single-casting housing.

10. The process variable transmitter of claim 1 wherein the shock protection annulus includes a key which is rotatable relative to the sensor module to thereby align with wiring of the nuclear power plant facility.

* * * * *